United States Patent [19]

Sykora

[11] Patent Number: 4,860,252

[45] Date of Patent: Aug. 22, 1989

[54] SELF-ADAPTIVE COMPUTER MEMORY ADDRESS ALLOCATION SYSTEM

[75] Inventor: Boleslav Sykora, Kanata, Canada

[73] Assignee: Mitel Corp., Ontario, Canada

[21] Appl. No.: 794,695

[22] Filed: Nov. 4, 1985

[30] Foreign Application Priority Data

May 28, 1985 [CA] Canada .................................. 482566

[51] Int. Cl.$^4$ ............................................. G06F 12/02
[52] U.S. Cl. ...................................................... 364/900
[58] Field of Search ... 364/900 MS File, 200 MS File

[56] References Cited

U.S. PATENT DOCUMENTS

| | | | |
|---|---|---|---|
| 3,815,103 | 6/1974 | Holtey | 364/200 |
| 3,959,774 | 5/1976 | Mead | 364/200 |
| 3,972,028 | 7/1976 | Weber et al. | 364/200 |
| 4,025,903 | 5/1977 | Kaufman | 364/200 |
| 4,030,080 | 6/1977 | Burkett | 364/900 |
| 4,037,212 | 7/1977 | Nomiya | 364/200 |
| 4,050,098 | 9/1977 | Seipp | 364/900 |
| 4,234,934 | 11/1980 | Thorsrud | 364/900 |
| 4,303,993 | 12/1981 | Panepinto | 364/200 |
| 4,400,794 | 8/1983 | Koos | 364/200 |
| 4,414,627 | 11/1983 | Nakamura | 364/200 |
| 4,468,729 | 8/1984 | Schwartz | 364/200 |
| 4,545,010 | 10/1985 | Salas | 364/200 |
| 4,562,532 | 12/1985 | Nishizawa et al. | 364/200 |
| 4,571,676 | 2/1986 | Mantellina | 364/200 |
| 4,589,063 | 5/1986 | Shah et al. | 364/200 |
| 4,592,011 | 5/1986 | Mantellina et al. | 364/900 |
| 4,609,986 | 9/1986 | Hartmann | 364/200 |
| 4,622,633 | 11/1986 | Ceccon et al. | 364/200 |

FOREIGN PATENT DOCUMENTS 20121381 10/1984 European Pat. Off. .
1112510 5/1968 United Kingdom .

OTHER PUBLICATIONS

*Logical Design of Digital Systems*, by Friedman, (1975), pp. 252–255.
*Microprocessors and Microcomputer Development Systems*, by Rafiquzzaman, (1984), pp. 50–63.

Primary Examiner—Gary V. Harkcom
Assistant Examiner—Lawrence E. Anderson
Attorney, Agent, or Firm—Antonelli, Terry & Wands

[57] ABSTRACT

A self-adaptive computer memory address allocation apparatus and method for detecting the presence of memory chips connected to predetermined memory banks of a plurality of memory modules in a computer system, receiving and remapping address signals, and contiguously enabling the predetermined memory banks in response thereto. A programmable logic array generates enable signals for enabling the predetermined memory banks of the memory modules in response to receiving address and control signals from a main controller. The remapping process is performed during power up such that no wait states are introduced during subsequent memory accesses.

3 Claims, 2 Drawing Sheets

SELF-ADAPTIVE COMPUTER MEMORY ADDRESS ALLOCATION SYSTEM

BACKGROUND OF THE INVENTION

This invention relates in general to computer systems, and in particular to a self-adaptive computer memory address allocation system for detecting the presence or memory circuits in a computer system and remapping memory addresses in response thereto.

Computer systems are typically comprised of one or more memory modules comprised of a plurality of memory banks to which memory circuits, such as dynamic random access memory chips (DRAMs), are connected. A main controller (e.g. a CPU) typically generates address signals for accessing predetermined memory locations of the memory circuits. For example, an address signal is usually received by the memory modules and decoded therein, such that a predetermined one of the memory banks is enabled and a predetermined DRAM memory location defined by the address signal, is accessed.

In a straightforward computer system having a fixed (non-expandable) amount of memory, there is typically a one-to-one correspondence (mapping) between the generated address signals and the DRAM memory locations.

It is desirable that the number of memory banks be expandable, thereby accommodating a greater number of memory circuits, in order to implement software revisions, or store large amounts of data, etc. In order to effect memory expansion in the past, costly redesign and rewiring of memory module address decoding circuitry was typically required.

One prior art memory management system sought to overcome the disadvantages of costly redesign and rewiring by utilizing a plurality of hardware address multiplexers and an operating system program which included a subroutine for remapping address signals during execution of an application program. The remapping process was said to be "on-line". The remapped address signals were then used for accessing the actual DRAM memory locations. The aforementioned remapping subroutine and additional hardware was complex, and execution of the subroutine was found to be time consuming. Typically, one or more main controller wait states were required to implement the address remapping since a multiplicity of bank switching access instructions were inserted in the program code, thereby substantially reducing speed of execution of the application program as well as increasing the likelihood of memory access errors.

The remapping subroutine was dedicated, or non self-adaptive, since further memory expansion (or reduction) required modification of various parameters of the program which in turn, usually required replacement of a floppy disk or ROM on which the operating system program was stored

SUMMARY OF THE INVENTION

According to the present invention, an inexpensive, self-adaptive memory management system is provided for detecting the presence of memory circuits connected to predetermined memory banks of a plurality of memory modules in a computer system, and during an initialization procedure remapping address signals generated by a main controller and subsequently generating enable signals for contiguously enabling (that is, as contiguous memory) the predetermined memory banks.

According to a preferred embodiment, the enable signal circuits are comprised of programmable logic circuits generating the aforementioned enable signals for enabling the predetermined ones of the memory banks during each memory access without requiring any extra time penalty in the form of wait states.

A typical computer system may have two memory modules, denoted as main and expander memory modules, wherein each module accommodates up to 2.5M bytes of memory using five 512k byte memory banks Memory addresses of the main and expander modules are required to be contiguous. Thus, the first memory location of the expander memory module would have an address of 280000 (hex). However, in the event the main memory module is not filled to capacity (2.5 M bytes), but actually has only 1M byte of DRAM chips connected thereto (i.e. two of the five memory banks are filled), the last valid memory address on the main memory module is 0FFFFF (hex), and the next contiguous address would be 100000 (hex).

According to the present invention only 1M byte of memory would be detected on the main memory module, and in response predetermined control signals are transmitted to the enable signal circuits such that, in the event the main controller generates an address signal of 100000 (hex), the enable signal circuits on the expander module remap the memory locations starting at 280000 (hex) to an address of 100000 (hex) and the enable signal circuits on the main memory module disable the memory address space from 100000 (hex) such that the access is made to the first location on the expander memory module and not the location 100000 on the main memory module. Thus, the second memory bank of the main memory module is made contiguous with the first bank of the expander module.

The system is inexpensive, and the memory detection process is preferably performed prior to the first memory access (i.e. during power-up), such that no wait states are required to be executed during subsequent memory accesses, as in the prior art "on-line" technique.

In the event further banks of the main memory module are filled (i.e. the third, fourth or fifth banks, etc.), the memory management system detects the presence of the expanded memory during initialization or power-up, and remaps the first memory location of the memory module so as to be contiguous with the last valid memory address of the expander main memory module. Hence, the system is self-adaptive and the prior art disadvantage of requiring revision of the operating system program by replacement of a floppy disk or ROM, or by extensive redesign and rewiring, is overcome.

In general, the invention is a computer memory address allocation system for connection to a plurality of memory modules each having a plurality of memory banks thereof, predetermined ones of which have one or more memory circuits connected thereto. The invention is comprised of a circuit for generating address signals, circuitry for receiving first ones of the address signals and detecting the presence of memory circuits connected to the predetermined memory banks in response thereto, and circuitry for receiving and remapping further ones of the address signals and contiguously enabling the predetermined memory banks in response thereto, whereby variations in the number of memory circuits connected to the aforementioned plurality of memory modules is automatically compensated for while addressing said modules.

More particularly the invention is a computer memory address allocation system for connection to a plurality memory each having a plurality of memory banks thereof, predetermined ones of which have one or memory circuits connected thereto. The invention is comprised of a circuit generating address signals, a circuit for receiving predetermined first ones of the address signals and generating enable signals for enabling successive ones of the plurality of memory banks in response thereto, a circuit for detecting the presence of memory circuits connected to predetermined ones of the aforementioned successfully enabled memory banks and generating one or more control signals in response thereto, and a circuit for receiving the control signals and further ones of the address signals, remapping received further address signals and contiguously enabling the predetermined memory banks in response thereto.

The invention, is also a method of computer memory address allocation for use in conjunction with one or more memory modules each having a plurality of memory banks, predetermined ones of which have one or more memory circuits connected thereto, comprising the steps of generating address and control signals, receiving first ones of the address and control signals and detecting the presence of memory circuits connected to the predetermined memory banks in response thereto, and receiving second ones of the address and control signals and contiguously enabling corresponding ones of the predetermined memory banks in response to receiving the second address and control signals and the detection of the presence of the memory circuits.

A better understanding of the invention will be obtained with reference to the detailed description below, in conjunction with the following drawings, in which:

DESCRIPTION OF THE PREFERRED EMBODIMENT

Figure 1:
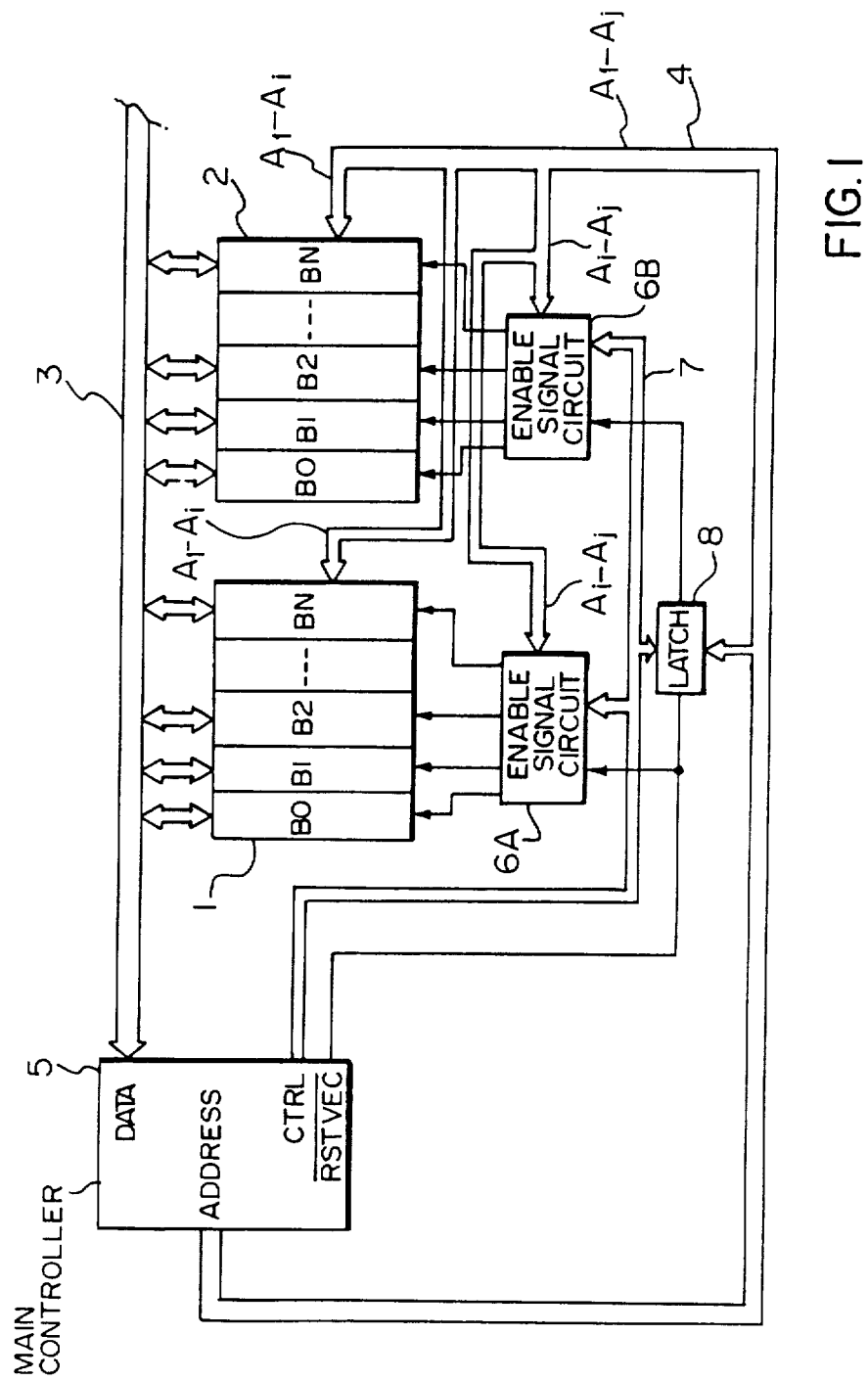
FIG. 1 is a block diagram of a memory management system according to the present invention.

With reference to FIG. 1, a main memory module 1 and an expander memory module 2 are each comprised of a plurality of memory banks B0, B1, B2 ... BN. Each memory bank is typically comprised of one or more DRAM chips (such as 64k or 256k DRAM chips). Data terminals of respective ones of the memory banks are connected to a data bus 3, and address inputs to the memory banks are connected to address lines A1-Ai of an address bus 4 connected to main controller 5, such as a microprocessor.

First and second enable signal generation circuits 6A and 6B have enable outputs thereof connected to inputs of respective ones of the memory banks B0, B1, B2 ... BN in the main and expander memory modules 1 and 2. A first plurality of address inputs to the enable signal circuits are connected to Ai-Aj address lines of the address bus 4, and a second plurality of inputs are connected to a control bus 7 connected to the main controller 5. In addition, a $\overline{RSTVEC}$ signal output from the main controller 5 is connected to a further input of enable signal circuit 6A and via a latch 8 to a further input of enable signal circuit 6B, under control of signals on the address and control buses 4 and 7 respectively.

In operation, the main controller 5 generates predetermined address and control signals on the address and control busses 4 and 7, and on the $\overline{RSTVEC}$ output thereof, for application to enable signal circuit 6A. In response, circuit 6A under software control successively enables memory banks B0, B1, B2 ... BN of the main memory module 1, and the main controller 5 detects the presence of memory chips connected thereto.

For example, memory bank B0 is enabled by the enable signal circuit 6A and the main controller 5 generates a data signal on data bus 3 for storage in a predetermined location of memory bank B0. Next, the main controller 5 reads the data signal stored in the predetermined location. In the event memory bank B0 has DRAM chips connected thereto, the main controller 5 reads the data signal previously stored therein. However, in the event memory bank B0 has no DRAM chips connected thereto, a default signal of for example FF (hex), is read by the main controller 5 in response to accessing the non-existent DRAM chips. In the event of detection of DRAM chips, memory bank B0 is maintained enabled and bank B1 is enabled and the DRAM chip detection process is repeated.

In the event of detection of an empty memory bank (i.e. a bank having no DRAM chips connected thereto), the main controller 5 disables the empty memory bank and stores predetermined control signals in enable signal circuits indicative of the number of memory banks B0, B1, B2 ... BN of main memory module 1 having DRAM chips connected thereto, such that the first valid memory location of expander memory module 2 is remapped so as to be contiguous with the last valid location of the main memory module 1, as described in greater detail below with respect to FIG. 2.

Hence, during execution of a program by the main controller 5, memory addresses are remapped by the circuits 6A and 6B so as to enable contiguous memory locations of the main and expander memory modules 1 and 2, respectively.

The $\overline{RSTVEC}$ signal is a reset signal which disables all memory modules during a system reset to allow a vector fetch from ROM. It alternately enables the main expander memory modules via latch 8 in order to resolve data bus contention during the remapping process.

Figure 2:
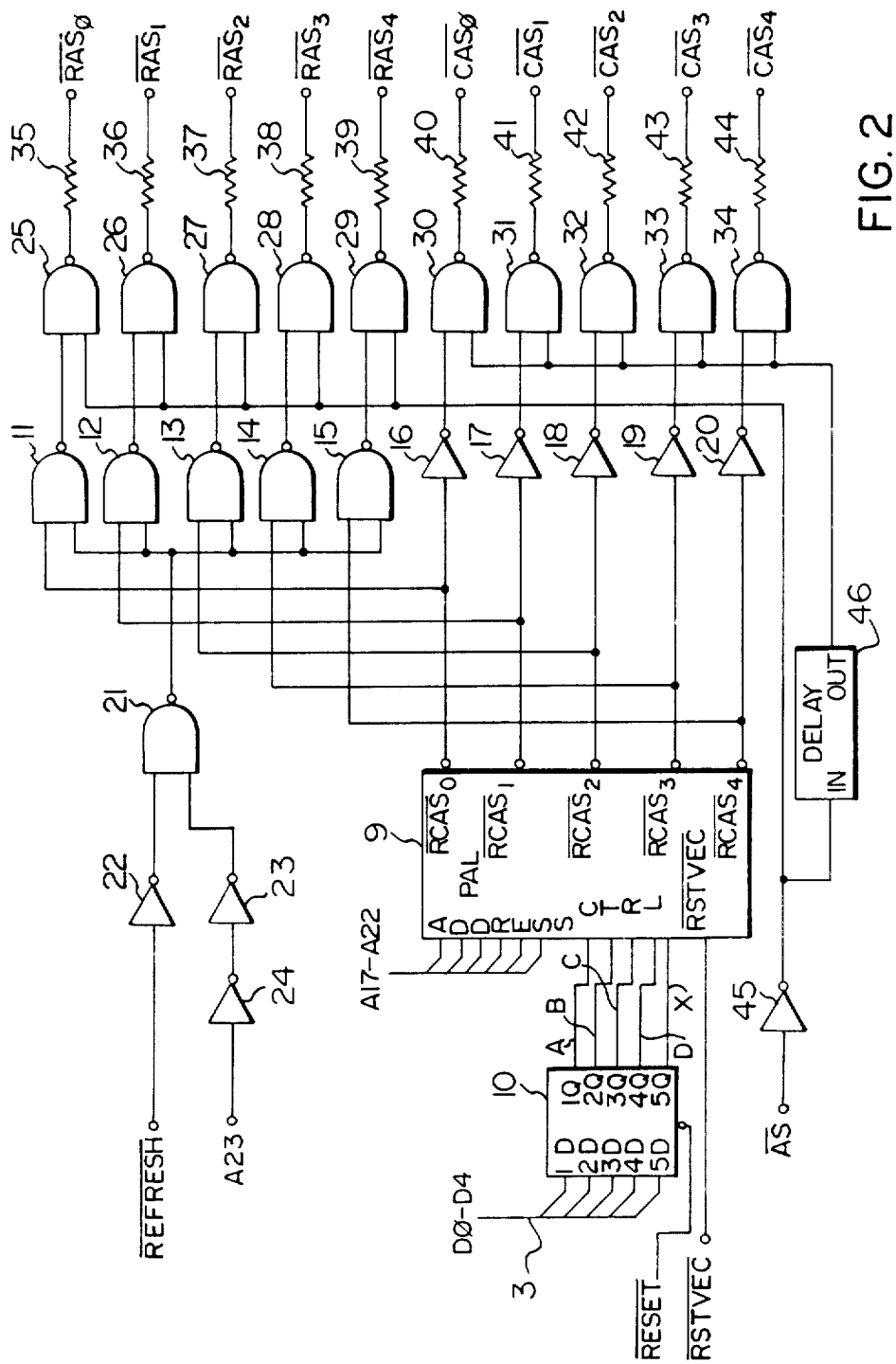
FIG. 2 is a schematic diagram of an enable signal generation circuit according to a preferred embodiment of the present invention.

With reference to FIG. 2, a schematic diagram of the enable signal circuit 6A or 6B is illustrated. According to the preferred embodiment of the invention, each of the modules 1 and 2 is comprised of five memory banks denoted B0-B4. A programmable array logic (PAL) 9 is shown having ADDRESS inputs thereof connected to address lines A17-A22 of the address bus 4. The address lines A17-A22 correspond to address lines Ai-Aj in FIG. 1. Data lines D0-D4 of the data bus 3 (FIG. 1) are connected to data inputs 1D-5D respectively, of a data register 10. A reset input of resister 10 is connected to a $\overline{RESET}$ control line of control bus 7. Outputs 1Q, 2Q, 3Q, 4Q and 5Q of register 10 are connected to control inputs CTRL of PAL 9, and generate control signals A, B, C, D and X respectively, described in further detail below. A further control input of PAL 9, denoted as $\overline{RSTVEC}$, is connected to the $\overline{RSTVEC}$ output of the main controller 5 as discussed above with reference to FIG. 1, or in the case of enable signal circuit 6B, the $\overline{\text{RSTVEC}}$ input of PAL 9 is connected to the output of latch 8 connected to the $\overline{\text{RSTVEC}}$ output of main controller 5.

Outputs $\overline{\text{RCAS0}}$, $\overline{\text{RCAS1}}$, $\overline{\text{RCAS2}}$, $\overline{\text{RCAS3}}$ and $\overline{\text{RCAS4}}$ of PAL 9 are connected to first inputs of NAND gates 11, 12, 13, 14 and 15 respectively, and to NOT gates 16, 17, 18, 19 and 20 respectively. Second inputs of NAND gates 11-15 are connected to an output of NAND gate 21.

A first input of NAND gate 21 is connected to an output of a NOT gate 22, an input of which is connected to a $\overline{\text{REFRESH}}$ control line of control bus 7 connected to controller 5. A second input of NAND gate 21 is connected to the output of series connected NOT gates 23 and 24. An input of gate 24 is connected to an address line A23 of the main controller 5, and an output thereof is connected to an input of NOT gate 23.

Outputs of NAND gates 11-15 are connected to first inputs of NAND gates 25-29 respectively, and the outputs of NOT gates 16-20 are connected to first inputs of a plurality of NAND gates 30-34 respectively. Outputs of NAND gates 25-34 are connected to output resistors 35-44, respectively.

Output resistors 35-39 are connected to row address select output terminals $\overline{\text{RAS0}}$-$\overline{\text{RAS4}}$ respectively, and output resistors 40-44 are connected to column address select terminals $\overline{\text{CAS0}}$-$\overline{\text{CAS4}}$ respectively. The row and column address output terminals $\overline{\text{RAS0}}$-$\overline{\text{RAS4}}$ and $\overline{\text{CAS0}}$-$\overline{\text{RAS4}}$ are connected to row and column enable inputs of respective ones of memory banks B0-B4, of the main memory module 1.

An address select output $\overline{\text{AS}}$ from the main controller 5 is connected to a NOT gate 45, an output of which is connected to second inputs of NAND gates 25-29, and to an input (IN) of a delay line 46, an output (OUT) thereof being connected to second inputs of NAND gates 30-34.

In operation, the amount of memory connected to adjacent ones of the memory banks B0-B4 of the main memory module 1 (FIG. 1) is first detected. PAL 9 generates active low signals on predetermined ones of the outputs $\overline{\text{RCAS0}}$-$\overline{\text{RCAS4}}$ in response to receiving predetermined signals on the address and control inputs (ADDRESS and CTRL) thereof, as a result of being programmed in a well know manner according to equations set out below with reference to TABLES 1 and 2.

According to the preferred embodiment, memory modules 1 and 2 (FIG. 1) are each comprised of five memory banks B0-B4 containing 64k or 256k chips, it will DRAM chips, as discussed above. In the event main memory module 1 is comprised of 64k chips, it will accomodate up to 640k bytes of data. In the event the main memory module is comprised of 256k chips, it will accomodate up to 2.5M bytes of data. Similarly, the expander memory module 2 will also accomodate either 64k or 256k chips, but not both.

PAL equations for generating the active low enable signals on the $\overline{\text{RCAS0}}$-$\overline{\text{RCAS4}}$ outputs, for enabling predetermined ones of the memory banks, are illustrated in TABLES 1 and 2 respectively.

TABLE 1

PAL EQUATIONS FOR 64k CHIPS $\overline{\text{RCAS0}}$ =
/A22 * /A21 * /A20 * /A19 * /A18 * /A17 * RSTVEC * /X +
/A22 * /A21 * /A20 * /A19 * /A18 * A17 * RSTVEC * X * /C * /O * A +
/A22 * /A21 * A20 * /A19 * /A18 * /A17 * RSTVEC * X * C * /O * /A +
/A22 * /A21 * A20 * A19 * /A18 * /A17 * RSTVEC * X * C * /O * A +
/A22 * A21 * /A20 * /A19 * /A18 * /A17 * RSTVEC * X * C * O * /A +
/A22 * A21 * /A20 * A19 * /A18 * /A17 * RSTVEC * X * C * O * A +
/A22 * /A21 * /A20 * A19 * /A18 * /A17 * RSTVEC * X * /C * O * A $\overline{\text{RCAS1}}$ =
/A22 * /A21 * /A20 * /A19 * /A18 * A17 * RSTVEC * /X * A +
/A22 * /A21 * /A20 * A19 * A18 * /A17 * RSTVEC * X * /C * /O * A * D +
/A22 * /A21 * A20 * /A19 * /A18 * A17 * RSTVEC * X * C * /O * /A * D +
/A22 * /A21 * A20 * A19 * /A18 * A17 * RSTVEC * X * C * /O * A * D +
/A22 * A21 * /A20 * /A19 * /A18 * A17 * RSTVEC * X * C * O * /A * D +
/A22 * A21 * /A20 * A19 * /A18 * A17 * RSTVEC * X * C * O * A * D +
/A22 * /A21 * /A20 * A19 * /A18 * A17 * RSTVEC * X * /C * O * A * D $\overline{\text{RCAS2}}$ =
/A22 * /A21 * /A20 * /A19 * A18 * /A17 * RSTVEC * /X * A * B +
/A22 * /A21 * /A20 * A19 * A18 * A17 * RSTVEC * X * /C * /O * A * D +
/A22 * /A21 * A20 * /A19 * A18 * /A17 * RSTVEC * X * C * /O * /A * D +
/A22 * /A21 * A20 * A19 * A18 * /A17 * RSTVEC * X * C * /O * A * D +
/A22 * A21 * /A20 * /A19 * A18 * /A17 * RSTVEC * X * C * O * /A * D +
/A22 * A21 * /A20 * A19 * A18 * /A17 * RSTVEC * X * C * O * A * D +
/A22 * /A21 * /A20 * A19 * A18 * /A17 * RSTVEC * X * /C * O * A * D $\overline{\text{RCAS3}}$ =
/A22 * /A21 * /A20 * /A19 * A18 * A17 * RSTVEC * /X * A * B * C +
/A22 * /A21 * A20 * /A19 * /A18 * /A17 * RSTVEC * X * /C * /O * A * D +
/A22 * /A21 * A20 * /A19 * A18 * A17 * RSTVEC * X * C * /O * /A * D +
/A22 * /A21 * A20 * A19 * A18 * A17 * RSTVEC * X * C * /O * A * D +
/A22 * A21 * /A20 * /A19 * A18 * A17 * RSTVEC * X * C * O * /A * D +
/A22 * A21 * /A20 * A19 * A18 * A17 * RSTVEC * X * C * O * A * D +
/A22 * /A21 * /A20 * A19 * A18 * A17 * RSTVEC * X * /C * O * A * D $\overline{\text{RCAS4}}$ =
/A22 * /A21 * /A20 * A19 * /A18 * /A17 * RSTVEC * /X * A * B * C *
/A22 * /A21 * A20 * /A19 * /A18 * A17 * RSTVEC * X * /C * /O * A * D +
/A22 * /A21 * A20 * A19 * /A18 * /A17 * RSTVEC * X * C * /O * /A * D +
/A22 * A21 * /A20 * /A19 * /A18 * /A17 * RSTVEC * X * C * /O * A * D +
/A22 * A21 * /A20 * A19 * /A18 * /A17 * RSTVEC * X * C * O * /A * D +

TABLE 1-continued
PAL EQUATIONS FOR 64k CHIPS

/A22 * A21 * A20 * /A19 * /A18 * /A17 * RSTVEC * X * C * O * A * D +
/A22 * /A21 * A20 * /A19 * /A18 * /A17 * RSTVEC * X * /C * O * A * D

TABLE 2
PAL EQUATIONS FOR 256k CHIPS $\overline{RCAS0}$ =
/A22 * /A21 * /A20 * /A19 * RSTVEC * /X +
/A22 * /A21 * /A20 * A19 * /A18 * A17 * RSTVEC * X * /C * /O * A +
/A22 * /A21 * A20 * /A19 * RSTVEC * X * C * /O * /A +
/A22 * /A21 * A20 * A19 * RSTVEC * X * C * /O * A +
/A22 * A21 * /A20 * /A19 * RSTVEC * X * C * B * /A +
/A22 * A21 * /A20 * A19 * RSTVEC * X * C * O * A +
/A22 * /A21 * /A20 * A19 * RSTVEC * X * /C * O * A $\overline{RCAS1}$ =
/A22 * /A21 * /A20 * A19 * RSTVEC * /X * A +
/A22 * /A21 * A20 * /A19 * /A18 * A17 * RSTVEC * X * /C * /O * A * D +
/A22 * /A21 * A20 * A19 * RSTVEC * X * C * /O * /A * D +
/A22 * A21 * /A20 * /A19 * RSTVEC * X * C * /O * A * D +
/A22 * A21 * /A20 * A19 * RSTVEC * X * C * O * /A * D +
/A22 * A21 * A20 * /A19 * RSTVEC * X * C * O * A * D +
/A22 * /A21 * A20 * /A19 * RSTVEC * X * /C * O * A * D $\overline{RCAS2}$ =
/A22 * /A21 * A20 * /A19 * RSTVEC * /X * A * B +
/A22 * /A21 * A20 * A19 * /A18 * A17 * RSTVEC * X * /C * /O * A * D +
/A22 * A21 * /A20 * /A19 * RSTVEC * X * C * /O * /A * D +
/A22 * A21 * /A20 * A19 * RSTVEC * X * C * /O * A * D +
/A22 * A21 * A20 * /A19 * RSTVEC * X * C * O * /A * D +
/A22 * A21 * A20 * A19 * RSTVEC * X * C * O * A * D +
/A22 * /A21 * A20 * A19 * RSTVEC * X * /C * O * A * D $\overline{RCAS3}$ =
/A22 * /A21 * A20 * A19 * RSTVEC * /X * A * B * C +
/A22 * A21 * /A20 * /A19 * /A18 * A17 * RSTVEC * X * /C * /O * A * D +
/A22 * A21 * /A20 * A19 * RSTVEC * X * C * /O * /A * D +
/A22 * A21 * A20 * /A19 * RSTVEC * X * C * /O * A * D +
/A22 * A21 * A20 * A19 * RSTVEC * X * C * O * /A * D +
A22 * /A21 * /A20 * /A19 * RSTVEC * X * C * O * A * D +
/A22 * A21 * /A20 * /A19 * RSTVEC * X * /C * O * A * D $\overline{RCAS4}$ =
/A22 * A21 * /A20 * /A19 * RSTVEC * /X * A * B * C * D +
/A22 * A21 * /A20 * A19 * /A18 * A17 * RSTVEC * X * /C * /B * A * D +
/A22 * A21 * A20 * /A19 * RSTVEC * X * C * /O * /A * D +
/A22 * A21 * A20 * A19 * RSTVEC * X * C * /O * A * D +
A22 * /A21 * /A20 * /A19 * RSTVEC * X * C * O * /A * D +
A22 * /A21 * /A20 * A19 * RSTVEC * X * C * O * A * D +
/A22 * A21 * /A20 * A19 * RSTVEC * X * /C * O * A * D Operation of the preferred embodiment will be described with reference to FIGS. 1 and 2, and TABLE 2, and considering a scenario in which 256k chips are disposed in the B0 and B1 banks main memory module 1, and in the B0 bank of expander memory module 2.

According to the preferred embodiment, data bus 3 is a 16 bit data bus while the DRAM chips are 1 bit devices. Hence, 16 DRAM chips are disposed in each of the memory banks in order to generate 16 bit data signals. Hence, for the above mentioned scenario, each bank contains 512k bytes of memory, resulting in a total of 1 M bytes in main memory module 1 and 512k bytes in the expander memory module 2, for a total system memory of 1.5 M bytes.

In response to a system reset or power-up, an initialization routine is executed wherein the main controller 5 generates logic low signals on the address lines A3-A23 of address bus 4 (FIG. 1), and on the $\overline{RSTVEC}$ output and the $\overline{RESET}$ line of control bus 7 such that the the 1Q-5Q outputs of register 10 and the ADDRESS, CTRL and $\overline{RSTVEC}$ inputs of PAL 9 have logic low ,level signals applied thereto, and the logic low $\overline{RSTVEC}$ signal is latched into latch 8 under control of signals on the address and control buses 4 and 7, in a well known manner. A logic high signal is then generated on the $\overline{RSTVEC}$ output and applied to enable signal circuit 6A. Hence, the $\overline{RCAS0}$ output of PAL 9 goes high, enabling 512k bytes of memory on the memory bank B0 of the main memory module 1.

Enable signal circuit 6B remains disabled as a result of $\overline{RSTVEC}$ being latched at a low logic level in latch 8 (FIG. 1). Thus, none of banks B0-B5 of expander memory module 2 are enabled, thereby avoiding contention on the data bus 3 (FIG. 1).

In order to determine whether or not DRAM chips are connected to the memory bank B0, a predetermined memory location within the aforementioned enable 512k bytes is selected (as described in detail below) and a hexadecimal data signal is written thereto from the main controller 5 via data bus 3. The data signal is then read by the main controller 5 in the event a DRAM chip is connected to the enabled memory bank B0. However, in the event of no DRAM chip being connected to the enabled memory bank B0, a default data signal of FF (hex) is received therefrom.

In order to determine the size of memory (i.e., the number of memory banks B0–B4 having DRAM chips connected thereto), each of the memory banks is successively enabled and checked in the manner described above.

For example, in order to enable memory bank B1, the main controller 5 generates a logic high signal for application to the 1D input of register 10, and stored therein. A logic high signal (A) is transmitted from register 10 to a corresponding one of the control inputs (CTRL) of PAL 9. Hence, with X, B, C and D at logic low levels and A at a logic high level, the $\overline{RCAS1}$ output of PAL 9 goes to a logic low level in response to an address signal 0001 being generated on the A22–A19 address lines, by the main controller 5, (see TABLE 2).

The logic low output signal from the $\overline{RCAS1}$ output is applied to the first input of NAND gate 12. The output of NAND gate 21 is normally at a logic high level, but goes to a logic low level in response to an active low $\overline{REFRESH}$ signal being inverted and applied thereto via inverter 22, in conjunction with a logic high signal being received on address line A23. Hence, the output of NAND gate 12 goes from a normally logic low level to a logic high level in response to the $\overline{RCAS1}$ output of PAL 9 going to a logic low level or the output of NAND gate 21 going to a logic low level (i.e., during DRAM refresh, discussed in further detail below).

The logic high signal from NAND gate 12 is applied to the first input of NAND gate 26. The second input of NAND gate 26 receives a logic high signal in response to an active low address select signal $\overline{AS}$ being generated by the main controller 5 and received and inverted in inverter 45 and applied to NAND gate 26. The output of NAND gate 26 goes to a logic low level in response to receiving the aforementioned logic high signals on the inputs thereof, thereby generating a row memory select signal $\overline{RAS1}$ for enabling all rows of memory in the B1 memory bank.

The active low $\overline{RCAS1}$ signal output is inverted in NOT gate 17 and applied to the first input of NAND gate 31. The inverted $\overline{AS}$ signal is delayed by approximately 80 nanoseconds in delay line 46, and applied to the second input of NAND gate 31. Hence, the output of NAND gate 31 goes to a logic low level, thereby generating a column memory select signal $\overline{CAS1}$ for enabling columns of memory in memory bank B1 approximately 80 nanoseconds after generation of the $\overline{RAS1}$ signal, and thereby completely enabling the B1 memory bank.

An approximately 80 nanosecond delay is implemented between the row select and column select outputs $\overline{RAS1}$ and $\overline{CAS1}$ in order to provide sufficient time for 8 bit row address signals to be latched in order to multiplex the address inputs of DRAM circuits (i.e., there is a predetermined amount of capacitive loading associated with the DRAM chips), before latching in 8 bit column address signals, in a well known manner.

With memory bank B1 enabled in response to receiving the $\overline{RAS1}$ and $\overline{CAS1}$ signals, the main controller 5 writes and then reads the above mentioned data signal to a predetermined memory location therein as discussed above, in order to detect the presence of DRAM memory chips connected to the B1 memory bank.

As discussed above, according to the present scenario the B0 and B1 memory banks of the main memory module have DRAM chips connected thereto. The main controller 5, therefore detects the presence of the DRAM chips and then proceeds to check the B2 memory bank.

In order to check the B2 memory bank, logic low C, D and X signals are applied to the inputs CTRL of PAL 9, and logic high A and B signals are also applied thereto, such that the $\overline{RCAS2}$ output generates an active low logic signal in response to address signal 0010 (hex) being generated by the A22–A19 address lines, (TABLE 2 and FIG. 2). The $\overline{RAS2}$ and $\overline{CAS2}$ outputs of NAND gate 27 and 32 go respectively low in order to enable the memory bank B2. The main controller 5 writes to and attempts to read a data signal from a predetermined location within memory bank B2, but reads instead a default signal FF (hex) since no DRAM chips are connected thereto. Hence, the main controller 5 detects the presence of DRAM chips on only the B0 and B1 memory banks and generates a first control signals having a logic high D0 signal and logic low D1–D3 signals for storage in register 10. Thus, register 10 generates a control signal for application to the CTRL inputs of PAL 9 wherein the A control signal is at a logic high level and the B, C and D signals are at logic low levels. Consequently, only the B0 and B1 banks of the main memory module 1 are enabled in response to receiving further address signals from the main controller 5.

The main controller 5 then generates a second control signal for storage in enable signal circuit 6B in order that address signals received on the address lines A17–A22 are remapped so as to provide contiguity between the last valid memory location on the main memory module 1 and the first location on the expander memory module 2.

As discussed above, enable signal generation circuits 6A and 6B are of identical design (as illustrated in FIG. 2) but the $\overline{RSTVEC}$ input of PAL 9 in circuit 6A is connected directly to the $\overline{RSTVEC}$ output of main controller 5, while the $\overline{RSTVEC}$ input of PAL 9 in circuit 6B is connected to the output of a latch 8 which has an input connected to the the $\overline{RSTVEC}$ output of main controller 5. Either of the PALs 9 of circuits 6A or 6B may be programmed according to the equations of either TABLES 1 or 2, in order to accomodate 64k or 256k DRAM chips.

The main controller 5 loads the above mentioned second control signal into register 10 of enable signal circuit 6B. According to the second control signal the X and C signals are at logic high levels and are applied to the control input (CTRL) of PAL 9, and the A, B and D signals are at logic low levels and are also applied thereto. The main controller then switches the latch 8 such that $\overline{RSTVEC}$ for module 6B goes to a logic high. The $\overline{RCAS0}$ output of PAL 9 of enable circuit 6B goes to an active logic low level in response to address signal 0010 (hex) generated by the A22–A19 address lines, resulting in the third OR term in the PAL equation thereof being true, (TABLE 2).

With reference to TABLE 2, it can be seen that with bank B0 of main memory module 1 enabled, the values of address lines A22, A21, A20 and A19 are all 0; with band B1 thereof enabled, A22, A21, A20 and A19 are 0, 0, 0 and 1 respectively; and with bank B0 of expander memory module 2 enable, A22, A21, A20 and A19 are 0, 0, 1 and 0 respectively. Hence, it is seen that the starting address of memory in expander module 2 has been made contiguous with the last address location in main memory module 1.

The main controller 5 writes and reads data from a predetermined memory location in memory bank B0 of the expander memory module 2, in order to determine whether DRAM chips are connected thereto.

Next, the B1 bank of expander memory module 2 is enabled in response to the $\overline{\text{RCAS1}}$ output of PAL 9 of enable circuit 6B going to an active logic low signal. The $\overline{\text{RCAS1}}$ output goes active low in response to a value of 0011 being applied to the A22, A21, A20 and A19 inputs of PAL 9, resulting in the third "OR" term of the $\overline{\text{RCAS1}}$ equation in TABLE 2 being true. The B1 memory bank is written to for determining whether DRAM chips are connected thereto, and a value of FF is subsequently read therefrom, indicating no DRAM chips in bank B1.

As discussed above, the DRAM chips are periodically refreshed in response to generation of a $\overline{\text{REFRESH}}$ signal by the main controller 5. Outputs of NAND gates 11-15 each go to logic high levels in response to generation of the $\overline{\text{REFRESH}}$ signal and a logic high signal on the A23 address line of the address bus 4, (FIG. 1). The outputs of NAND gates 25-29 go to logic low levels in response to the outputs of NAND gates 11-15 going to logic high levels and in response to reception of a logic high signal from NOT gate 45 resulting from a logic low $\overline{\text{AS}}$ signal being generated. Hence, the $\overline{\text{RAS0}}$-$\overline{\text{RAS4}}$ row address outputs of NAND gates 25-29 go to logic low levels simultaneously for causing refresh of 2.5 M bytes of memory, (or 640k bytes in the event 64k chips are used).

In a successful prototype, the main memory module 1 accommodated 6 memory sizes, depending on whether 64k or 256k byte DRAM chips were utilized. TABLE 3 lists the logic levels of the A, B and C signals conforming to the various memory sizes on the main memory module 1, which are applied to the control inputs (CTRL) of PAL 9 of enable signal circuit 6B, in order to relocate the starting address so as to be contiguous with the last valid memory location of the main memory module 1.

TABLE 3

| C B A | SIZE (bytes) |
|-------|--------------|
| 0 1 1 | 512k |
| 0 0 1 | 640k |
| 1 0 0 | 1 M |
| 1 0 1 | 1.5 M |
| 1 1 0 | 2 M |
| 1 1 1 | 2.5 M |

In order to utilize the present invention properly, DRAM chips must be connected to adjacent memory banks of the memory module. For example, the invention will not function properly in the event the B0, B1 and B3 memory banks of the main memory module 1 have DRAM chips connected thereto but no chips are connected to the B2 memory banks. In particular, the main controller 5 will only detect the presence of chips connected to B0 and B1 banks.

Variations or alternative embodiments may now be conceived of by a person skilled in the art understanding the present invention. For instance, main memory module 1 and expander memory module 2 can be comprised of greater or less than 5 memory banks, or a greater number of memory modules and corresponding enable signal circuits can be utilized, and the memory chips connected thereto can be larger or smaller than 64k and 256k bytes respectively, suitable changes being made in the PAL equations shown in TABLES 1 and 2.

Also, while the description herein refers to DRAM chips, other memory circuits such as bubble memory or static RAM, etc., can be utilized, appropriate modifications being made to the enable signal generation circuits 6A and 6B.

In addition, while it is preferred that PAL circuits be utilized for implementing the enable signal circuits of the present invention, other programmable logic circuits may be used, such as programmable logic arrays (PLAs), etc.

Other embodiments or variations in design may be conceived of by a person understanding this invention. All are considered to be within the sphere and scope of the invention as defined in the claims appended hereto.

I claim:

1. A computer memory address allocation system for connection to first and second memory modules each comprised of a plurality of memory banks, predetermined ones of said memory banks having one or more memory circuits connected thereto, comprising:

(a) a main controller for successively storing and retrieving data signals to and from respective ones of said memory banks, comparing said stored and retrieved data signals, and in response generating first and second control signals indicative of the number of said memory banks in each of said first and second modules which have memory circuits connected thereto;

(b) first and second programmable logic circuits connected to said main controller and said first and second memory modules, for receiving said first and second control signals, respectively, and further ones of said address signals, and in response generating enable signals for enabling said predetermined memory banks having memory circuits connected thereto are addressed and enabled as contiguous memory;

(c) refresh control circuitry for periodically generating refreshed signals; and (d) first and second row and column address decoding circuits connected to said refresh control circuitry, and to said first and second programmable logic circuits respectively, for generating row and column select signals for enabling rows and columns of said memory banks in response to receiving one or more of said refresh signals or said enable signals;

wherein each of said row and column address decoding circuits includes an inverter connected to said main controller, for receiving a memory select control signal therefrom, a delay circuit connected to said inverter, for delaying said received memory select control signal, a first plurality of NAND gates having inputs connected to said refresh control circuitry and predetermined outputs of a corresponding one of said programmable logic circuits, a plurality of NOT gates having inputs connected to said outputs of the corresponding one of the programmable logic circuits, for receiving and inverting said enable signals, a second plurality of NAND gates having first inputs connected to outputs of said plurality of NAND gates and second inputs connected to said inverter, for generating said row select signals in response to receiving said memory select control signal and generation of one of said refresh or enable signals, and a third plurality of NAND gates first inputs connected to said NOT gates and second inputs connected to said delay circuits, for generating said column select signals in response to receiving a delayed version of said memory signal and said inverted enable signals.

2. A computer memory address allocation system as defined in claim 1 wherein said programmable logic circuits are programmable array logic circuits.

3. A computer memory address allocation system as defined in claim 1 wherein said programmable logic circuits are programmable logic arrays.

* * * * *